US012711405B2

(12) United States Patent
Igure et al.

(10) Patent No.: US 12,711,405 B2
(45) Date of Patent: Aug. 18, 2026

(54) SYSTEMS AND METHODS FOR MACHINE LEARNING DATASET GENERATION

(71) Applicant: Capital One Services, LLC, McLean, VA (US)

(72) Inventors: Vinay Igure, Ashburn, VA (US); Stalin D'Souza, Brooklyn, NY (US); Jaime Mantilla, Cranford, NJ (US); Scott Karp, Washington, DC (US); Elena Ogorodnikova, Springfield, VA (US); David Sachitano, Union City, NJ (US); Parag Jain, Falls Church, VA (US); Niel Ketkar, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1147 days.

(21) Appl. No.: 17/733,512

(22) Filed: Apr. 29, 2022

(65) Prior Publication Data

US 2023/0351224 A1 Nov. 2, 2023

(51) Int. Cl.
*G06N 5/04* (2023.01)
*G06F 16/2455* (2019.01)
*G06F 18/214* (2023.01)
*G06N 20/00* (2019.01)

(52) U.S. Cl.
CPC ......... *G06N 5/04* (2013.01); *G06F 16/24568* (2019.01); *G06F 18/2148* (2023.01); *G06N 20/00* (2019.01)

(58) Field of Classification Search
CPC .... G06N 5/04; G06N 20/00; G06F 16/24568; G06F 18/2148
See application file for complete search history.

(56) References Cited

U.S. PATENT DOCUMENTS 9,210,056 B1 * 12/2015 Choudhary ........... H04L 69/329
2017/0118240 A1 * 4/2017 Devi Reddy .......... G06N 20/00
2017/0180136 A1 * 6/2017 Ibasco ................. H04L 63/0428
2020/0253320 A1 * 8/2020 Guard ................... A63F 13/245
2020/0320005 A1 * 10/2020 Shulman ........... G06F 16/24552
2022/0381651 A1 * 12/2022 Gorgievski ........ G06K 7/10722
2022/0397995 A1 * 12/2022 Misra .................... G06F 3/0483
2023/0034337 A1 * 2/2023 Gorski .................. G07F 17/323

* cited by examiner

*Primary Examiner* — James T Tsai
(74) *Attorney, Agent, or Firm* — Foley & Lardner LLP

(57) ABSTRACT

In some aspects, methods and systems may use consumption timestamps to ensure consistency between data used during inference and data used to train a machine learning model. Specifically, methods and systems may generate a consumption timestamp corresponding to the time at which the streaming data is received or inserted into a database. The consumption timestamp may be used as a synchronization point for any related data that may be requested (e.g., via an API). After streaming data is received, the consumption timestamp may be generated and assigned to any data that is requested in connection with the streaming data. The streaming data, related data, and consumption timestamp may be included in a data snapshot that is provided to a machine learning model for inference (e.g., real-time inference) or training.

20 Claims, 4 Drawing Sheets

SYSTEMS AND METHODS FOR MACHINE LEARNING DATASET GENERATION

BACKGROUND

A machine learning pipeline manages the flow of data into, and output from, one or more machine learning models. It may include data input, features, the machine learning model(s) and model parameters, and outputs of the machine learning model(s). A machine learning pipeline may be used to automate the machine learning workflow by enabling data to be transformed and correlated into a model that can then be analyzed to achieve outputs. This type of machine learning pipeline makes the process of inputting data into the machine learning model fully automated. Machine learning pipelines may include multiple sequential steps that perform a variety of tasks from data extraction and preprocessing to model training and deployment. Ultimately, the purpose of a pipeline is to provide increased efficiency and scalability for the machine learning iteration cycle.

Data streaming is a feature often added to data or machine learning pipelines, and may include sending data from sources to targets as events happen. Streaming may enable delivery of accurate and relevant data. In some cases, a pipeline may use a query method to poll a source database on a regular interval using a query predicate based on a timestamp. Data streaming can be useful because many compelling machine learning use cases center on real-time calculations. Real time may mean milliseconds, seconds, or minutes, or a variety of other time periods that are sufficient for responding to an event. For example, a machine learning model may have a short window of opportunity to generate recommendations or personalize web pages. This creates the need for streaming data to be included in machine learning pipelines.

SUMMARY

In a machine learning pipeline, a machine learning model may initially perform an inference on obtained data and, subsequently, use the obtained data to train with the goal of increasing the performance of the machine learning model. In many cases, the machine learning model may need to obtain data and perform inference in real time (e.g., within milliseconds, seconds, or minutes of an event occurring) in response to an event that has occurred. For example, the machine learning model may be used to generate a prediction in response to detecting a user interaction (e.g., with a website or other software application). Streaming data associated with the event may be used by the machine learning model to perform inference. The streaming data may include a timestamp that was created by the streaming data source indicating the time at which the streaming data was created.

To improve the ability of the machine learning model to perform inference, a computing system may request additional data (e.g., a real-time query via an application programming interface (API)) that is related to the streaming data. The additional data may include data that is related to the event, data that is related to the user that is interacting with the website or other software application, and/or some other similar kind of data However, due to the time-sensitive nature of real-time inference, some of the streaming data associated with the real-time query may not have arrived in time for the machine learning model to perform inference using both the streaming data and the additional data. This may happen in part because some of the streaming data may experience network delays while propagating through a data pipeline and may not arrive in time. This creates a problem with inconsistent data because while the real-time query data, which may be based on an inference timestamp, may not include all of the streaming data, a subsequent query for the data (e.g., a subsequent use of the data to further train the machine learning model) will include all of the streaming data. Thus, using the inference timestamp may be problematic because the inference timestamp represents when the data was available for publishing by the streaming data source and not when the streaming data was available for consumption (e.g., for use by the machine learning model). This inconsistency in data between real-time inference and subsequent training may inhibit the performance of the machine learning model. For example, the machine learning model may be more difficult to train due to the difference in data that is available when performing inference and when performing training.

To solve the issues described above, non-conventional methods and systems described herein use consumption timestamps to more accurately represent the data available for real-time inference and/or to ensure consistency between data used during inference and data used to train the machine learning model. Specifically, methods and systems described herein may generate a consumption timestamp corresponding to the time at which the streaming data is received or inserted into a database. After streaming data is received, the consumption timestamp may be generated and assigned to any data that is requested in connection with the streaming data. The inference timestamp may be used as the synchronization point for retrieving streaming data (e.g., by querying the consumption timestamp) and the additional data. The streaming data, related data, and consumption timestamp may be included in a data snapshot that is provided to a machine learning model for inference (e.g., real-time inference) and/or training. For example, a computing system may generate a consumption timestamp indicating a time at which the streaming data is received, synchronize the streaming data and the API data by assigning the inference timestamp to the API data and the streaming data, and generate a data snapshot comprising the streaming data, the consumption timestamp, and the API data. Because the consumption timestamp is assigned to, or otherwise associated with, the streaming data and the related data (e.g., API data), data resulting from the real-time query and any subsequent query for the consumption timestamp will be consistent. By doing so, training and performance (e.g., recall, precision, accuracy, etc.) of the machine learning model may be improved.

In some aspects, a computing system may receive, via a streaming system, a streaming data comprising an indication of one or more events that have occurred. Based on receiving the streaming data, the computing system may generate a consumption timestamp indicating a time at which the streaming data is received. The computing system may send, based on receiving the streaming data or based on receiving an indication that an event has occurred, a request for additional data associated with the one or more events. Based on the request for the additional data, the computing system may receive the additional data associated with the one or more events. The computing system may generate a data snapshot comprising the streaming data, the consumption timestamp, and the additional data. Based on providing the data snapshot to a machine learning model, the computing system may generate a prediction corresponding to the data snapshot. After generating a prediction corresponding to the data snapshot, the computing system may use the data snapshot to train the machine learning model.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
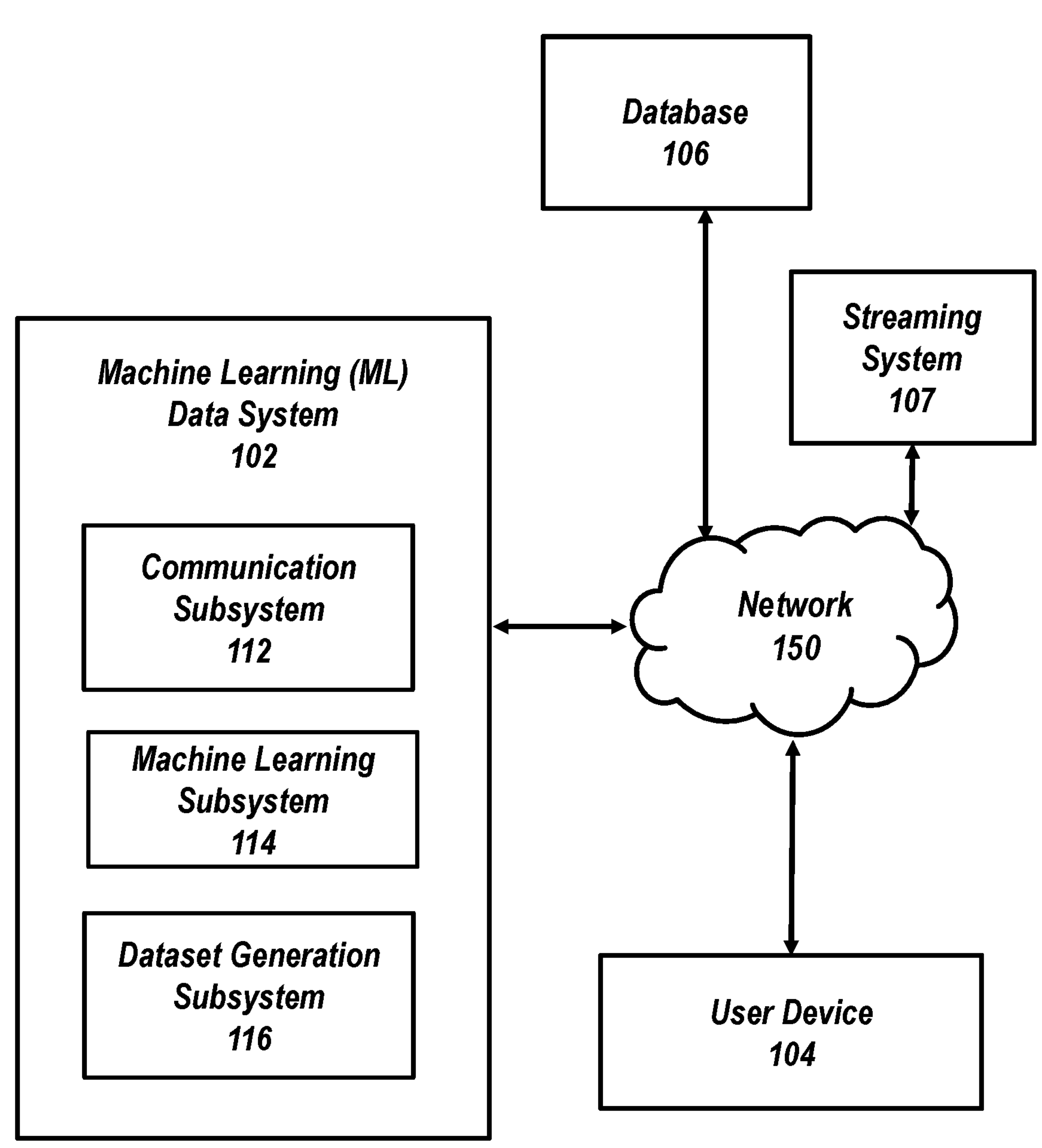
FIG. 1 shows an illustrative diagram for using a consumption timestamp to provide consistent data for inference by, or training of, machine learning models, in accordance with one or more embodiments.

FIG. 1 shows an illustrative system 100 for using a consumption timestamp to provide consistent data for inference by, and training of, machine learning models, in accordance with one or more embodiments. The system 100 has numerous practical applications and may be used in a variety of machine learning pipelines to help provide data that is consistent for inference and training. For example, the system 100 can be used to provide data to machine learning models that detect objects, determine whether a cyber security intrusion has occurred, detect the presence of cancer in medical data, approve or disapprove a user for a loan or other product offering, or a variety of other practical applications.

The system 100 may include a machine learning (ML) data system 102, a database 106, a streaming system 107, and a user device 104. The ML data system 102 may include a communication subsystem 112, a machine learning subsystem 114, and a dataset generation subsystem 116. Each of the ML data system 102, the database 106, and/or the user device 104 may be a variety of computing devices (e.g., physical or virtual) including a server, a virtual machine, a desktop, a mobile device (e.g., a smartphone) or any other device or component described below in connection with FIGS. 2-4. The ML data system 102 may receive, from the streaming system 107, streaming data comprising an indication of one or more events that have occurred. For example, the one or more events may include an action that a user has performed via a website or a mobile application. Based on receiving the streaming data, the ML data system 102 may generate a consumption timestamp.

The ML data system 102 may send (e.g., via the communication subsystem 112) a request for additional data associated with the one or more events (e.g., a user interaction). Based on the request for the additional data, the ML data system 102 may receive the additional data associated with the one or more events. The ML data system 102 may generate (e.g., via the dataset generation subsystem 116) a data snapshot comprising the streaming data, the consumption timestamp, and the additional data. Based on providing the data snapshot to a machine learning model, the ML data system 102 may generate (e.g., via the machine learning subsystem 114) a prediction corresponding to the data snapshot. After generating a prediction corresponding to the data snapshot, the ML data system 102 may use the data snapshot to train the machine learning model. Additionally or alternatively, the system 100 may perform any action described below in connection with FIGS. 2-4.

The streaming system 107 may provide a streaming service. As referred to herein, a "streaming service" may include an advanced message queuing protocol (AMQP). In some embodiments, the streaming service may include any AMQP described below in connection with FIG. 3. In some embodiments, the streaming service may provide data (e.g., asynchronously) to the ML data system 102. For example, when a user performs an action via a website or mobile application, the streaming service may send an indication of the action that was performed, an identification of the user, the time at which the action was performed, or a variety of other information.

The data provided via the streaming service or via the streaming system 107 may include streaming data. As referred to herein, streaming data may include data that is generated in real time (e.g., within milliseconds, seconds, minutes, etc.) based on an event that has occurred. For example, the event may include a cyber security event (e.g., a detection of an intrusion), credit scoring (e.g., prediction of a credit score of a user), fraudulent transaction detection (e.g., credit card fraud), a user interaction with a website or mobile application, or a variety of other events.

The ML data system 102 may send one or more requests for data, for example, in response to receiving streaming data from the streaming system 107. The data that is requested may be application programming interface (API) data and may be requested via an API. For example, if the streaming data corresponds to an action taken by a user, the API data may include demographic information about the user (e.g., age, gender, occupation, etc.), user preferences, a user identification, products or services that the user has ordered or purchased in the past, or a variety of other information associated with the user.

The ML data system 102 may assign or otherwise cause a timestamp to be associated with streaming data or API data. A timestamp may include a year, month, day, and/or time. A timestamp may be in a variety of formats. A consumption timestamp may be a timestamp that indicates a time at which streaming data is received or ingested into the database 106. In some embodiments, a consumption timestamp may include a time prior to when streaming data is committed to the database 106. The timestamp assigned or associated with the API data may be a timestamp generated by a streaming data source or a timestamp generated at the time an event has occurred. Alternatively, the timestamp associated with the API data may be the consumption timestamp.

The ML data system 102 may generate one or more data snapshots. As referred to herein, a data snapshot may include a set of data that was available at a particular point in time. For example, a data snapshot may include a variety of data associated with an event or a user at a particular time stamp (e.g., the consumption time stamp). A data snapshot may include streaming data and API data. A data snapshot may include a portion of data that is associated with a timestamp. Data snapshots may include all data or a portion of data stored in a database at a particular point in time.

Figure 2:
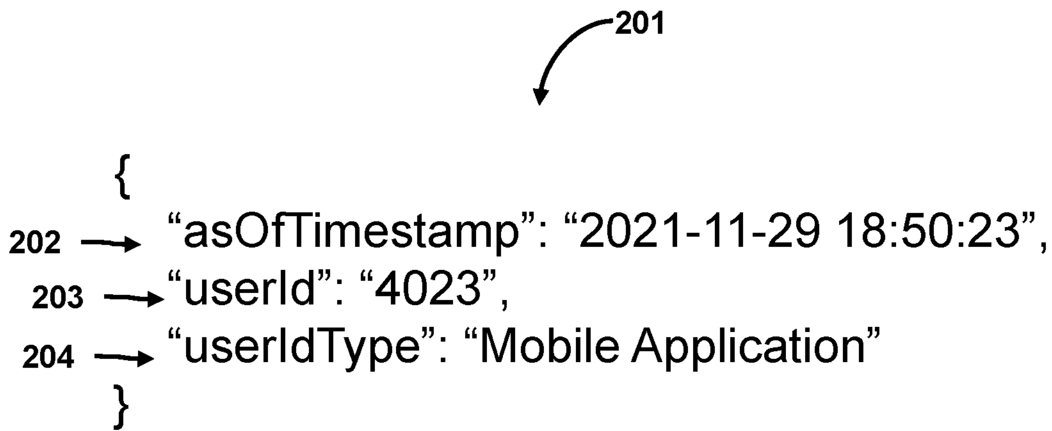
FIG. 2 shows an illustrative request that may be used to obtain a data snapshot, in accordance with one or more embodiments.

FIG. 2 shows an example request 201 for a data snapshot, in accordance with one or more embodiments. The request 201 includes a timestamp field 202, a user identification field 203, and a user identification type field 204. The timestamp field 202 may include a consumption timestamp described in connection with FIG. 1 and FIG. 4. The user identification field 203 may identify a user that performed an action at the time indicated by the timestamp field 202. The userIdType field 204 may indicate where an action was performed. For example, the userIdType field 204 may indicate that the action was taken via a mobile application. One or more data snapshots may be returned based on the request 201. The data snapshot may include any streaming data or API data that is associated with the consumption timestamp indicated by the timestamp field 202. For example, the data snapshot may include previous offers (e.g., for credit cards, loans, bank account openings, etc.) that the user identified by the user identification field 203 has accepted in the past. The data snapshot may include streaming data indicating banking offers (e.g., for credit cards, loans, bank account openings, etc.) that were displayed to the user at or around the consumption timestamp indicated by the timestamp field 202. By organizing data (e.g., streaming data and API data) by consumption timestamp, one or more machine learning models (e.g., as described in connection with FIG. 3) may be able to obtain data that is consistent for inference and for training. For example, this may enable a machine learning model to more accurately perform inference to predict whether the user will accept an offer or may enable a machine learning model to train in a more efficient manner (e.g., with fewer epochs, less training time, etc.).

Figure 3:
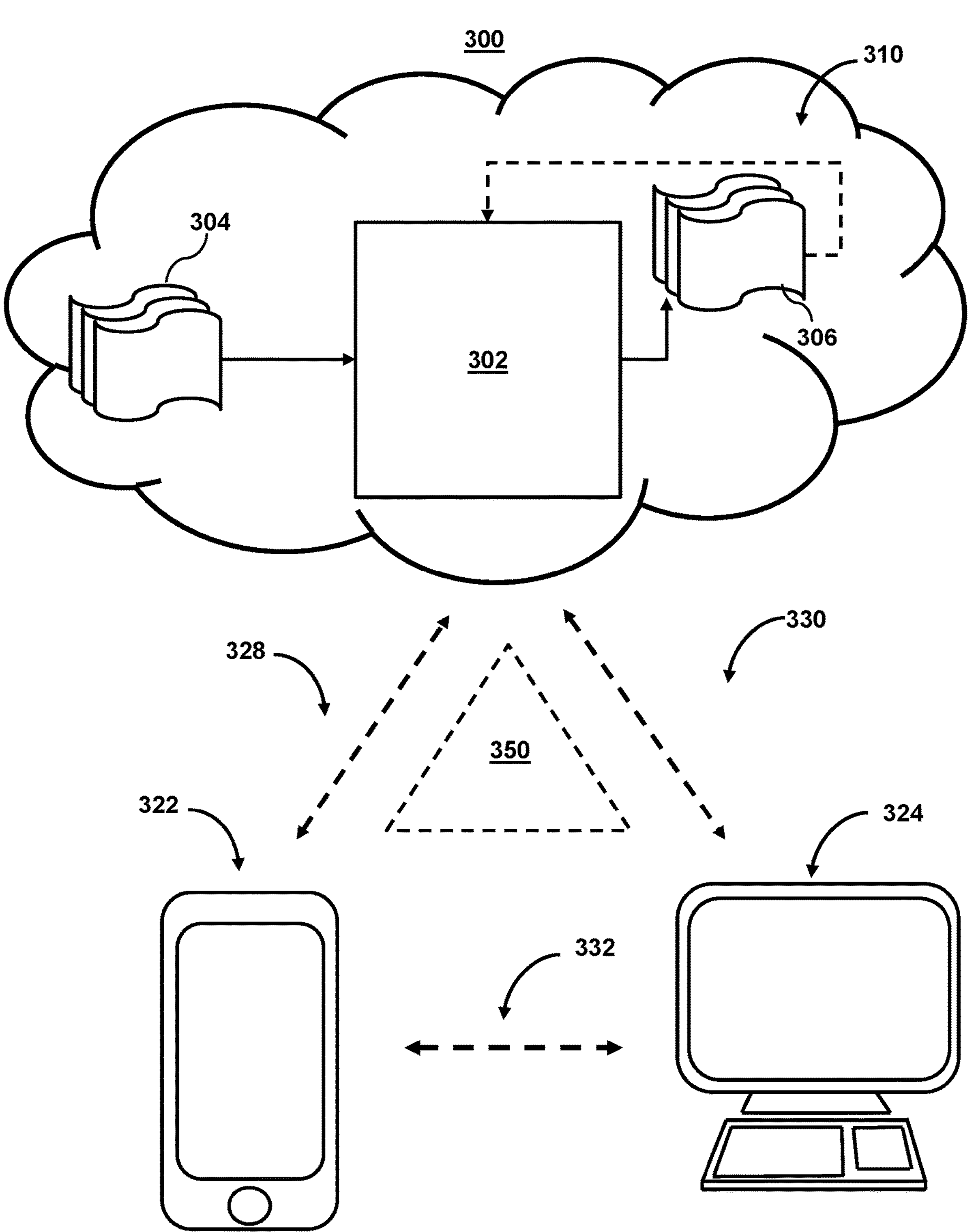
FIG. 3 shows illustrative components for a system used to provide consistent data for inference by, or training of, machine learning models, in accordance with one or more embodiments.

FIG. 3 shows illustrative components for a system used to provide consistent data for inference by, or training of, machine learning models, in accordance with one or more embodiments. For example, FIG. 3 may show illustrative components for providing consistent data to train a machine learning model to predict an action that a user will take when interacting with a website or mobile application. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include the ML data system 102, the database 106, or the streaming system 107 as discussed above in connection with FIGS. 1-2. Cloud components 310 may access any streaming data or related data (e.g., API data) as described above in connection with FIGS. 1-2.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. The inputs may include a data snapshot as described above in connection with FIGS. 1-2. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., to predict an action that a user will take).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether a given input corresponds to a classification of model 302 (e.g., that a user will accept an offer for a banking product, that a cyber security intrusion event has occurred, etc.).

In some embodiments, the model (e.g., model 302) may automatically perform actions based on outputs 306. In some embodiments, the model (e.g., model 302) may not perform any actions. The output of the model (e.g., model 302) may be used to adjust banking offers to users, determine security vulnerabilities in computing systems, or a variety of other practical applications.

System 300 may also include API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be a representational state transfer (REST) or Web services API layer) may provide a decoupled interface to data and/or functionality of one or more applications. API layer 350 may provide a common, language-agnostic way of interacting with an application. Web services APIs offer a well-defined contract, called web services description language (WSDL), that describes the services in terms of their operations and the data types used to exchange information. REST APIs do not typically have this contract; instead, they are documented with client libraries for most common languages, including Ruby, Java, PHP, and JavaScript. Simple Object Access Protocol (SOAP) Web services have traditionally been adopted in the enterprise for publishing internal services, as well as for exchanging information with partners in business-to-business (B2B) transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end. In such cases, API layer 350 may use RESTful APIs (exposition to front-end or even communication between microservices). API layer 350 may use an advanced management queuing protocol (AMQP) (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
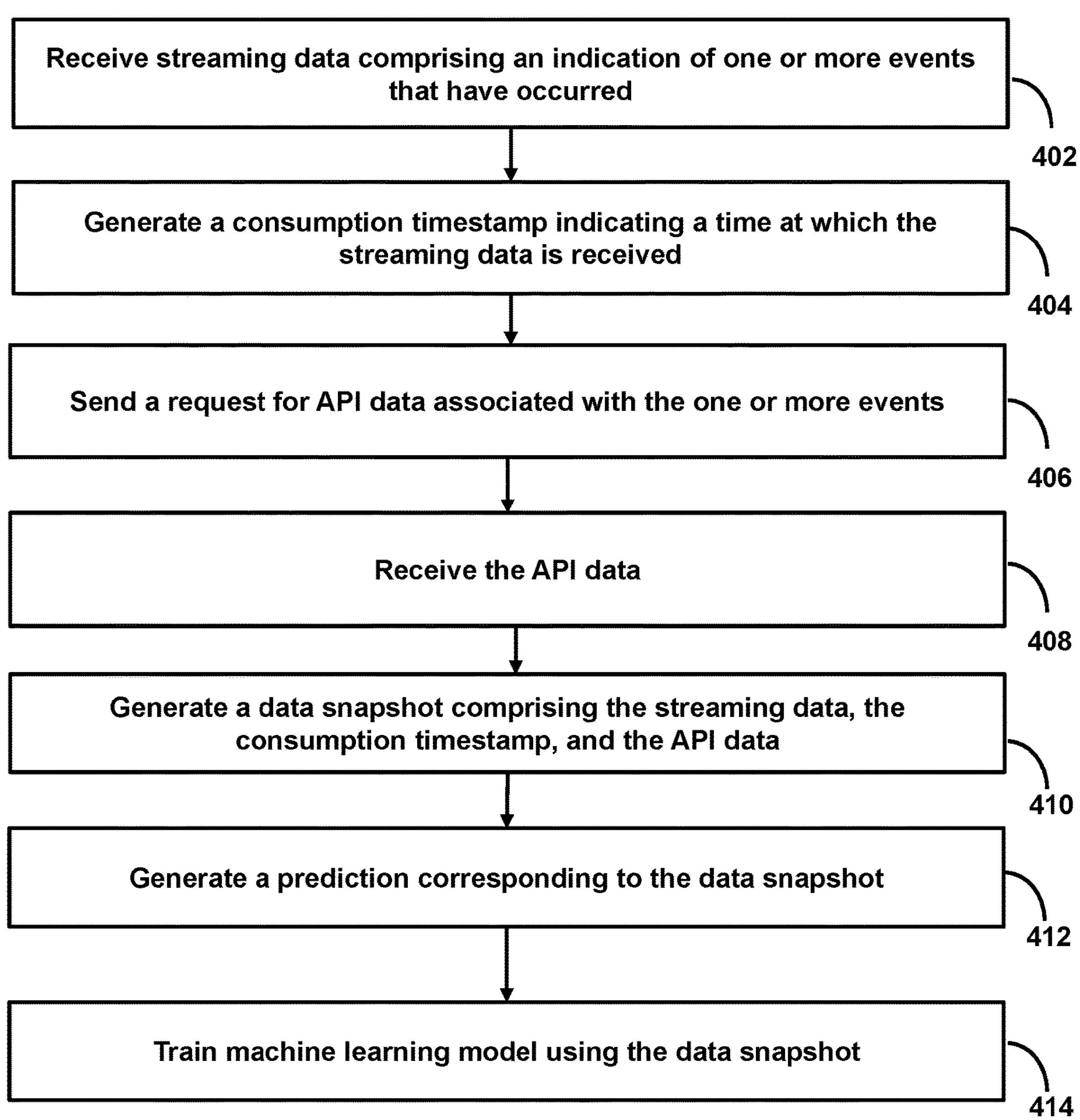
FIG. 4 shows a flowchart of the steps involved in using a consumption timestamp to more accurately represent the data available for real-time inference, in accordance with one or more embodiments.

FIG. 4 shows a flowchart of the steps involved in generating datasets that provide consistent inference by, and training of, machine learning models, in accordance with one or more embodiments. For example, the ML data system 102 may use process 400 (e.g., as implemented on one or more system components described above) in order to generate a dataset that may be used to train a machine learning model to predict the next action a user will take when interacting with a website associated with the ML data system 102.

At step 402, the ML data system 102 (e.g., using one or more components described above) receives streaming data from the streaming system 107. The streaming data may comprise an indication of one or more events that have occurred (e.g., as described above in connection with FIG. 1). For example, the ML data system 102 may receive, via a streaming service, streaming data comprising an indication of one or more actions performed by a user (e.g., when interacting with a mobile application or a website).

In some embodiments, the streaming data may be received asynchronously. For example, the streaming data may be received asynchronously from a plurality of computing devices (which may include the streaming system 107, e.g.) associated with an API. The streaming data may be sent from the streaming system 107 after each action a user takes via a website or mobile application. For example, each time the user interacts with a user interface element of a mobile application, the streaming system 107 may receive an indication of the interaction and may generate streaming data to send to the ML data system 102. The ML data system 102 may receive the streaming data at irregular intervals (e.g., the ML data system 102 may now know when the next portion of streaming data may be received).

At step 404, the ML data system 102 (e.g., using one or more components described above) generates a consumption timestamp that may be used as a reference point for a portion of data in the dataset. The consumption timestamp may indicate a time at which data is requested or is received. The consumption timestamp may indicate a time at which the streaming data is received. For example, based on receiving the streaming data, the ML data system 102 may generate a consumption timestamp indicating a time at which the streaming data is received. By doing so, the system may create a reference time that can be used to group together streaming data and any API data that has been requested (e.g., even if the API data has not yet been received).

In some embodiments, the streaming data may include an original timestamp corresponding to when the streaming data was created. The streaming data may have been initially created at the streaming system 107 or at the user device 104. The ML data system 102 may replace the original timestamp with the consumption timestamp. By doing so, the ML data system 102 may create a single reference time for the corresponding streaming data. The reference time (e.g., as indicated by the consumption timestamp) may be used to reference any data (e.g., related to the streaming data) that is available as of the consumption timestamp. For example, any data that is related to the streaming data and that has been requested via an asynchronous process may be associated with the consumption timestamp even if the request has not yet successfully completed (e.g., the data associated with the request has not yet been retrieved). In this way, streaming data may be grouped together with any other related data (e.g., API data) and with a consistent timestamp.

In some embodiments, the ML data system 102 may wait a threshold amount of time after receiving streaming data before generating a consumption timestamp or before generating a data snapshot (e.g., a data snapshot described below or above in connection with FIG. 1). For example, generating a consumption timestamp may include waiting a threshold amount of time after receiving a first portion of the streaming data; and after receiving a second portion of the streaming data, and based on the threshold amount of time expiring, generating a consumption timestamp corresponding to a time at which the threshold amount of time expired. By waiting a threshold amount of time, the ML data system 102 may be able to create data snapshots on a periodic basis. For example, in this way, a data snapshot may be created every 5 seconds, 30 seconds, 5 minutes, etc.

The ML data system 102 may determine the threshold amount of time to wait after receiving streaming data before generating a consumption timestamp or before generating a data snapshot. The ML data system 102 may use various factors to determine the threshold amount of time to wait. In some embodiments, the threshold amount may be based on a user setting, industry standard, or other static element. Alternatively or additionally, the system may set the threshold amount dynamically based on one or more detected characteristics. For example, the system may monitor the application from which the streaming data was generated (e.g., an application executing on the user device 104). The system may then determine the threshold amount based on the application using the streaming data. By doing so, the ML data system 102 may enable receipt of an entire portion of streaming data that may arrive in multiple parts. For example, the ML data system 102 may increase the threshold amount of time for applications that send streaming data less predictably in multiple parts and may decrease the threshold amount of time for applications that send the streaming data more predictably in a single transmission.

In another example, the system may monitor the source of the streaming data (e.g., the streaming system that sent the streaming data to the ML data system 102, the device to which the user device 104 sent information that was used to generate the streaming data, etc.). The system may then determine the threshold amount based on the source of the streaming data. By doing so, the ML data system 102 may ensure that complete streaming data is received because the threshold amount of time can be adjusted appropriately.

In another example, the system may monitor the time of day/year (e.g., time of year). The system may then determine the threshold amount based on the time of day/year. By doing so, the ML data system 102 may ensure that the streaming data has an adequate amount of time to arrive at the ML data system 102. For example, during some portions of the year, there may be increased network traffic or increased usage of an application or website. During these times, the ML data system 102 may increase the threshold amount of time.

In another example, the system may monitor current network conditions. The system may then determine the threshold amount based on the current network conditions. By doing so, the ML data system 102 may increase the efficiency of the system 100 by decreasing the threshold amount of time when the network has less traffic, when the network has greater bandwidth (e.g., greater than a threshold bandwidth), or when the network has lower latency (e.g., lower than a threshold latency).

In another example, the system may monitor the streaming rate of the system 107. The streaming rate may be the average frequency in which the streaming system 107 sends streaming data (e.g., average number of times per minute). The system may then determine the threshold amount based on the streaming rate. By doing so, the ML data system 102 may wait an appropriate amount of time to ensure that the streaming data is received. For example, the ML data system 102 may decrease the threshold amount of time to wait if the streaming frequency is below a threshold frequency.

In another example, the system may monitor a buffer capacity (e.g., a buffer capacity of the ML data system 102). The system may then determine the threshold amount based on the buffer capacity. By doing so, the ML data system 102 may avoid waiting too long and may prevent the buffer from being overloaded with streaming data.

In some embodiments, the system may determine the threshold amount by weighting various characteristics. For example, the system may apply a weight to one or more of the characteristics above (e.g., the application using the streaming data, the source of the stream, the time of day/year, the current network conditions, the streaming rate, or the buffer capacity). The system may then compare a resulting score to a threshold score. Similar to the threshold amount, the threshold score may be based on various factors. In some embodiments, the threshold score may vary with time in order to ensure that a threshold amount is triggered within a given time period. For example, the system may vary the threshold score, the weights attributed to one or more of the monitored characteristics, and/or the threshold amounts for the one or more threshold amounts.

At step 406, the ML data system 102 (e.g., using one or more components described above) sends a request for API data associated with the one or more events described above in connection with step 402. For example, the ML data system 102 may send, via an application programming interface (API) and based on receiving the streaming data, a request for API data associated with the one or more events. The API data may be any data that is related to a user that performed an action when interacting with a website or mobile application. For example, the API data may be any data described above in connection with FIG. 1. By doing so, the ML data system 102 may group any user-related data that is stored separately from the streaming data together with the consumption timestamp. By doing so, the ML data system 102 may be able to provide data that is consistent for inference and training to a machine learning model. This may enable the machine learning model to train more efficiently (e.g., with fewer computing resources, less electricity, less time, etc.) or may lead to increased performance of the machine learning model.

At step 408, the ML data system 102 (e.g., using one or more components described above) receives the API data that was requested at step 406. For example, based on the request for API data, the ML data system 102 may receive (e.g., via the communication subsystem 112) the API data associated with the one or more events. The ML data system 102 may receive the API data via a connection to the Internet, via a peer-to-peer network, or in a variety of other ways. In some embodiments, the ML data system 102 may receive the API data via a wireless connection or a wired connection.

At step 410, the ML data system 102 (e.g., using one or more components described above) generates a data snapshot comprising the streaming data, the consumption timestamp, and the API data. The data snapshot may be retrieved from a database using the consumption timestamp or a user identification. For example, the data snapshot may include a mapping with the consumption timestamp or the user identification as the key and the streaming data and API data as the value. The data snapshot may be searchable via the consumption timestamp. For example, by querying a time (e.g., a timestamp), the ML data system 102 may be able to retrieve one or more data snapshots associated with the time.

In some embodiments, generating a data snapshot may allow the ML data system 102 to synchronize the streaming data that is received at step 402 with other data (e.g., API data) that is related to the streaming data. For example, the ML data system 102 may synchronize the streaming data and the API data by assigning the consumption timestamp to the API data and the streaming data (e.g., tagging the API data and the streaming data with the consumption timestamp). Based on assigning the consumption timestamp to the API data and the streaming data, the ML data system 102 may generate the data snapshot. The data snapshot may be a data structure that comprises the consumption timestamp, the API data, and the streaming data.

At step 412, the ML data system 102 (e.g., using one or more components described above) generates a prediction corresponding to the data snapshot. For example, based on providing the data snapshot to a machine learning model, the ML data system 102 may generate a prediction corresponding to the data snapshot. The prediction may include an indication of the next action a user will take when interacting with a website or mobile application. For example, the prediction may indicate whether the user will accept a credit card offer, open a bank account, request a loan, or a variety of other actions. The prediction may be used to determine modifications to make to the website or application to increase user satisfaction. For example, if the prediction indicates that the user will not perform an action (e.g., due to a complicated user interface), the system 100 may determine a change (e.g., a change associated with the website or application) to make to increase the likelihood of the user performing the action (e.g., to make the user experience better and improve ease of use of the website or application).

At step 414, the ML data system 102 (e.g., using one or more components described above) trains a machine learning model using the data snapshot. For example, after generating a prediction corresponding to the data snapshot, the ML data system 102 may train the machine learning model using the data snapshot. The data snapshot may be included in a larger dataset comprising other data snapshots that correspond to other consumption timestamps. The ML data system 102 may use the dataset to train an existing machine learning model or other machine learning models to improve future predictions or classifications (e.g., with higher precision, recall, accuracy, etc.).

In some embodiments, the ML data system 102 may receive additional streaming data and may create additional data snapshots. The data received may be used to continuously train and improve one or more machine learning models (e.g., as described in connection with FIGS. 1-3). For example, after generating a prediction corresponding to a first data snapshot, the ML data system 102 may retrain the machine learning model using the data snapshot. The ML data system 102 may generate a second data snapshot based on second streaming data and a second consumption timestamp. The ML data system 102 may generate, via the retrained machine learning model, a prediction corresponding to the second data snapshot. By doing so, the ML data system 102 may be able to improve the performance (e.g., accuracy, recall, precision, etc.) of the machine learning model.

In some embodiments, the system 100 may store data snapshots in a cache to improve the efficiency of data snapshot retrieval. For example, the system 100 may receive, from a computing device, a request for the data snapshot. Based on receiving the request, the system 100 may cache the data snapshot in storage memory for a threshold time period. The ML data system 102 may initially need to retrieve data snapshots from the database 106. A retrieved data snapshot may be stored in a cache or other storage memory temporarily (e.g., for 24 hours, for 1 week, etc.). This may enable the ML data system 102 to more efficiently respond to requests for data snapshots.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for synchronizing datasets by a consumption timestamp to provide consistent inference by, and training of, machine learning models comprising: receiving, via a streaming service, a streaming data comprising an indication of one or more events that have occurred; based on receiving the streaming data, generating a consumption timestamp indicating a time at which the streaming data is received; sending, via an application programming interface (API) and based on receiving the streaming data, a request for API data associated with the one or more events; based on the request for API data, receiving the API data associated with the one or more events; generating a data snapshot comprising the streaming data, the consumption timestamp, and the API data; and based on providing the data snapshot to a machine learning model, generating a prediction corresponding to the data snapshot.
2. The method of the preceding embodiment, wherein generating a data snapshot comprises: synchronizing the streaming data and the API data by assigning the consumption timestamp to the API data and the streaming data; and based on assigning the consumption timestamp to the API data and the streaming data, generating the data snapshot.
3. The method of any of the preceding embodiments, further comprising: receiving, from a computing device, a request for the data snapshot; and based on receiving the request, caching the data snapshot in storage memory for a threshold time period.
4. The method of any of the preceding embodiments, wherein the streaming data comprises a first timestamp corresponding to when the streaming data was generated, the method further comprising replacing the first timestamp with the consumption timestamp.
5. The method of any of the preceding embodiments, wherein the streaming data is received asynchronously from a plurality of computing devices associated with the API.
6. The method of any of the preceding embodiments, further comprising: after generating a prediction corresponding to the data snapshot, retraining the machine learning model using the data snapshot; generating a second data snapshot based on second streaming data and a second consumption timestamp; and generating, via the retrained machine learning model, a prediction corresponding to the second data snapshot.
7. The method of any of the preceding embodiments, wherein generating a consumption timestamp comprises: waiting a threshold amount of time after receiving a first portion of the streaming data; and after receiving a second portion of the streaming data, and based on the threshold amount of time expiring, generating a consumption timestamp corresponding to a time at which the threshold amount of time expired.
8. The method of any of the preceding embodiments, wherein the one or more events comprises one or more actions performed by a user and wherein the API data comprises demographic information associated with the user.
9. The method of any of the preceding embodiments, wherein generating a prediction corresponding to the data snapshot comprises: inputting a portion of the data snapshot into the machine learning model; and generating, via the machine learning model, output that predicts a user's next action.
10. The method of any of the preceding embodiments, further comprising: based on generating the data snapshot, generating a user interface to display the consumption timestamp, and a portion of the streaming data.
11. A tangible, non-transitory, machine-readable medium storing instructions that, when executed by a data processing apparatus, cause the data processing apparatus to perform operations comprising those of any of embodiments 1-10.
12. A system comprising one or more processors; and memory storing instructions that, when executed by the processors, cause the processors to effectuate operations comprising those of any of embodiments 1-10.
13. A system comprising means for performing any of embodiments 1-10.

What is claimed is:

1. A machine learning data service system for synchronizing datasets by a consumption timestamp to provide consistent inference by machine learning models, the system comprising:

one or more processors programmed with computer program instructions that, when executed by the one or more processors, cause operations comprising:

in response to receiving, via a real-time streaming service, a streaming financial transaction data comprising (i) an indication of one or more actions performed by a user and (ii) a first timestamp indicating when the streaming financial transaction data was generated, sending, via an application programming interface (API), a request for API data associated with the user;

in response to receiving the API data associated with the user, generating a data snapshot comprising modified streaming data and the API data that are synchronized with a consumption timestamp indicating a time of the receiving of the streaming financial transaction data in lieu of the first timestamp indicating when the streaming financial transaction data was generated such that the modified streaming data includes the streaming financial transaction data without the first timestamp; and inputting the data snapshot to a machine learning model to obtain a prediction corresponding to the data snapshot.

2. A method comprising:

receiving, via a streaming service, a streaming data comprising an indication of one or more events that have occurred;

sending, via an application programming interface (API) and based on the streaming data, a request for API data associated with the one or more events;

generating a data snapshot comprising the streaming data, the API data, and a consumption timestamp (i) indicating a time of the receiving of the streaming data and (ii) associated with the streaming data and the API data; and based on providing the data snapshot to a machine learning model, generating a prediction corresponding to the data snapshot.

3. The method of claim 2, wherein generating the data snapshot comprises associating the consumption timestamp, indicating the time of the receiving of the streaming data, with the streaming data in lieu of a creation timestamp corresponding to a time at which the streaming data was generated.

4. The method of claim 2, wherein generating the data snapshot comprises generating the data snapshot to comprise the streaming data, the API data, and the consumption timestamp that corresponds to an expiration time of a threshold amount of time after receiving a first portion of the streaming data, despite receiving the first portion before the expiration time.

5. The method of claim 2, wherein sending the request for the API data comprises sending, based on the streaming data and the consumption timestamp being the time of the receiving of the streaming data, an API query comprising (i) an identifier associated with the one or more events and (ii) the consumption timestamp in lieu of an earlier timestamp corresponding to a time at which the streaming data was generated.

6. The method of claim 2, wherein the streaming data is received asynchronously from a plurality of computing devices associated with the API.

7. The method of claim 2, further comprising:

after generating the prediction corresponding to the data snapshot, retraining the machine learning model using the data snapshot;

generating a second data snapshot based on second streaming data and a second consumption timestamp; and generating, via the retrained machine learning model, a given prediction corresponding to the second data snapshot.

8. The method of claim 2, further comprising:

causing, based on the prediction corresponding to the data snapshot, a modification to a user interface to increase a likelihood of a user performing a target action.

9. The method of claim 2, wherein the one or more events comprise one or more actions performed by a user, and wherein the API data comprises demographic information associated with the user.

10. The method of claim 2, wherein generating the prediction corresponding to the data snapshot comprises:

inputting a portion of the data snapshot into the machine learning model; and generating, via the machine learning model, output that predicts a user's next action.

11. The method of claim 2, further comprising:

based on the data snapshot, displaying, on a user interface, the consumption timestamp and a portion of the streaming data.

12. One or more non-transitory computer-readable media comprising instructions that, when executed by one or more processors, cause operations comprising:

receiving, via a streaming service, a streaming data comprising an indication of one or more events that have occurred;

based on receiving the streaming data, generating a consumption timestamp indicating a time at which the streaming data is received;

sending, via an application programming interface (API) and based on receiving the streaming data, a request for API data associated with the one or more events;

based on the request for API data, receiving the API data associated with the one or more events;

generating a data snapshot comprising the streaming data, the consumption timestamp, and the API data; and based on providing the data snapshot to a machine learning model, generating a prediction corresponding to the data snapshot.

13. The one or more non-transitory computer-readable media of claim 12, wherein generating a data snapshot comprises associating the consumption timestamp, indicating the time of the receiving of the streaming data, with the streaming data in lieu of a creation timestamp corresponding to a time at which the streaming data was generated.

14. The one or more non-transitory computer-readable media of claim 12, wherein generating the data snapshot comprises generating the data snapshot to comprise the streaming data, the API data, and the consumption timestamp that corresponds to an expiration time of a threshold amount of time after receiving a first portion of the streaming data, despite receiving the first portion before the expiration time.

15. The one or more non-transitory computer-readable media of claim 12, wherein sending the request for API data comprises sending, based on the streaming data and the consumption timestamp being the time of the receiving of the streaming data, an API query comprising (i) an identifier associated with the one or more events and (ii) the consumption timestamp in lieu of an earlier timestamp corresponding to a time at which the streaming data was generated.

16. The one or more non-transitory computer-readable media of claim 12, wherein the streaming data is received asynchronously from a plurality of computing devices associated with the API.

17. The one or more non-transitory computer-readable media of claim 12, further comprising:

after generating the prediction corresponding to the data snapshot, retraining the machine learning model using the data snapshot;

generating a second data snapshot based on second streaming data and a second consumption timestamp; and generating, via the retrained machine learning model, a given prediction corresponding to the second data snapshot.

18. The one or more non-transitory computer-readable media of claim 12, the operations further comprising:

causing, based on the prediction corresponding to the data snapshot, a modification to a user interface to increase a likelihood of a user performing a target action.

19. The one or more non-transitory computer-readable media of claim 12, wherein the one or more events comprise one or more actions performed by a user, and wherein the API data comprises demographic information associated with the user.

20. The one or more non-transitory computer-readable media of claim 12, wherein generating the prediction corresponding to the data snapshot comprises:

inputting a portion of the data snapshot into the machine learning model; and generating, via the machine learning model, output that predicts a user's next action.

* * * * *